Aug. 12, 1952 P. PENBERTHY ET AL 2,606,678
LUMBER TRUCK UNLOADING DEVICE
Filed Sept. 29, 1947 2 SHEETS—SHEET 1
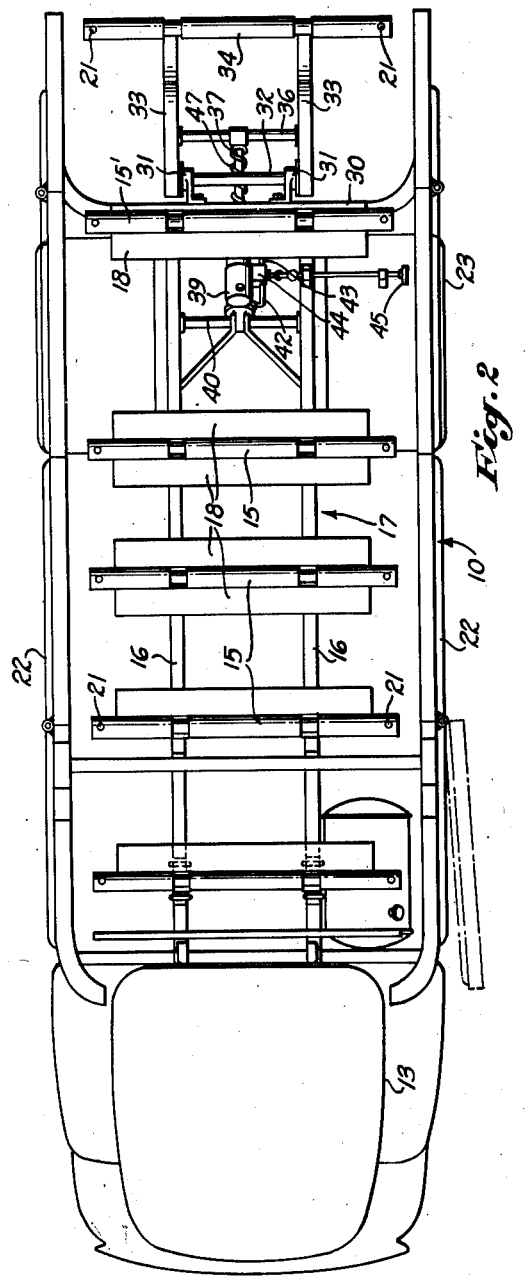
INVENTORS
*PAUL PENBERTHY*
*WELLINGTON EVERETT MILLER*
By THEIR ATTORNEYS
*HARRIS, KIECH, FOSTER & HARRIS*
By Aug. 12, 1952    P. PENBERTHY ET AL    2,606,678
LUMBER TRUCK UNLOADING DEVICE
Filed Sept. 29, 1947    2 SHEETS—SHEET 2
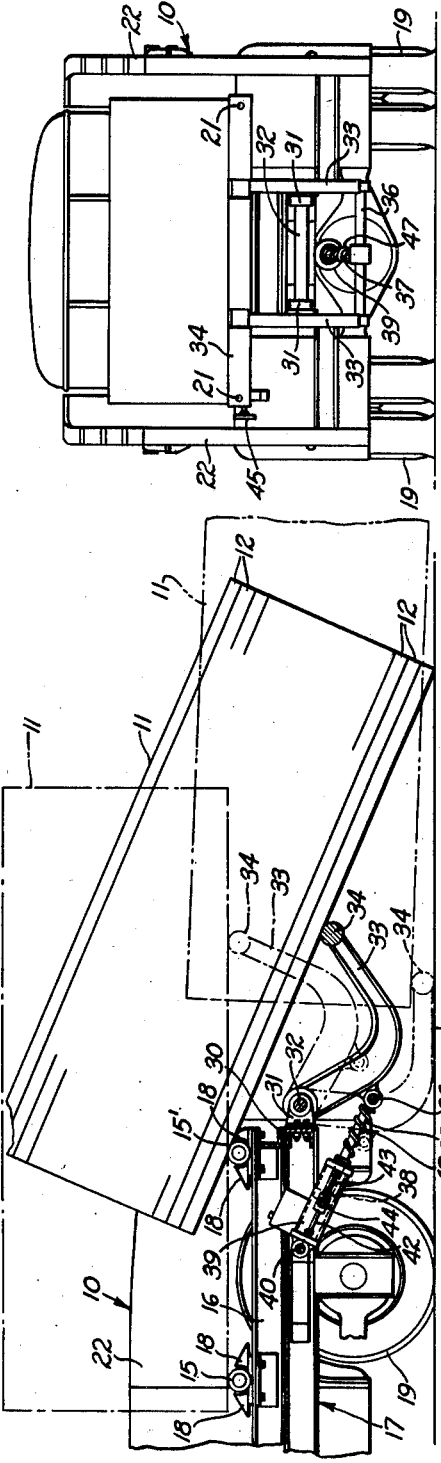
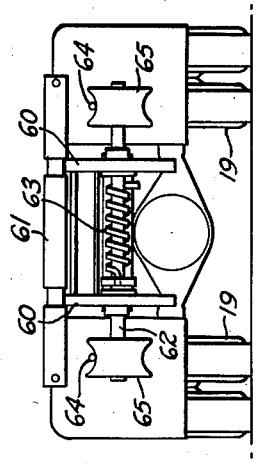
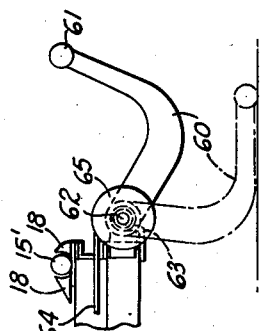
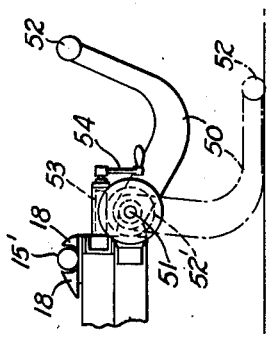
INVENTORS
PAUL PENBERTHY
WELLINGTON EVERETT MILLER
BY THEIR ATTORNEYS
HARRIS, KIECH, FOSTER & HARRIS Patented Aug. 12, 1952

2,606,678

UNITED STATES PATENT OFFICE 2,606,678

LUMBER TRUCK UNLOADING DEVICE

Paul Penberthy, Glendale, and Wellington Everett Miller, Los Angeles, Calif.; said Miller assignor to said Penberthy Application September 29, 1947, Serial No. 776,804

12 Claims. (Cl. 214—84)

Our invention relates to trucks and like vehicles for transporting lumber and other similar materials and is concerned particularly with material handling means associated with such trucks for facilitating the unloading of the material therefrom.

In transferring lumber from a lumber establishment to a site where the lumber is to be stored or used, the boards or planks are loaded onto the platform of the truck in stacked relation, such a stack of lumber often being five to ten feet high and, when composed of hardwood strips, has considerable weight. The truck is usually provided with longitudinally spaced, transverse rollers for supporting the stack of lumber and upon arrival of the truck at its destination the rollers are rotated to feed the stack rearwardly so as to cause the rearward end of the stack to fall onto the ground or other surface upon which the truck rests. In this manner the stack of lumber is caused to assume an inclined position with its forward end resting upon the rearmost roller of the series and, to deposit the stack completely onto the surface, the truck is moved forwardly, thus permitting the forward end of the stack to ride off the rearward supporting roller and fall onto the surface. Due to the impact of the heavy stack of lumber against the surface and the considerable distance through which the stack falls, the lowermost boards of the stack are often split or otherwise damaged, particularly if the stack is unloaded onto uneven or stony ground. Such a condition is costly to the lumber dealer, especially when high grade, hardwood pieces must be replaced due to such damage.

It is a primary object of our invention to alleviate the condition referred to above by providing a lumber truck having means incorporated therein for lowering the stack of lumber gradually onto the ground so as to prevent damage thereto. This object is best accomplished by providing a supporting and lowering means disposed at the rear end of the truck for supporting the rearward end of the stack and operable to gradually lower this end of the stack onto the ground after the stack has been slid rearwardly to a position where it is slightly overbalanced with respect to the rear end of the truck. The supporting means further functions to support the forward end of the stack of lumber when the truck is moved forwardly and, following this movement of the truck, the supporting means is moved downwardly to gradually lower the forward end of the stack into close proximity to the ground, continued movement of the truck acting to withdraw the supporting means from beneath the stack to permit the latter to rest upon the ground. By this provision, the stack of lumber is unloaded from the truck and placed upon the ground or other supporting surface in a systematic and controlled manner and, because the lumber is lowered gradually, damage to the boards is entirely avoided.

Another object of the invention is to provide a truck unloading means which preferably consists of a bifurcated supporting member pivotally mounted at the rear end of the truck and including a roller at its end adapted to be disposed in alignment with the rollers on the truck platform so as to form a rearward extension of the lumber supporting surface. The present lowering device is actually another roller identical with the others on the truck, but since it is extended beyond the end of the truck, it controls the first downward tilting movement of the lumber. This reduces the angle of inclination and thus a better control of the lumber in all the unloading positions is effected. This is a very important point since, heretofore, it has been very difficult to control the stack of lumber when it has been rolled rearward to the position where it becomes overbalanced and the rear end tilts and falls to the ground. When the stack of lumber is in this position, i. e., overbalanced, with one of its ends on the truck and its other end striking the surface, it tends to slide and if the lumber is surfaced, it is especially difficult to control and the lumber may slide through a considerable distance and thus cause damage thereto.

It is a further object to provide a supporting and lowering device which, in addition to being simple in construction, may be readily applied to existing as well as future trucks of the platform type.

A still further object is to provide a supporting and lowering device, of the character referred to, which is adapted to be operated in various ways, the present application disclosing several types of manually-controlled means for effecting operation of the device.

Further objects of the invention will become apparent from the following specification and the drawings, which are intended for the purpose of illustration only, and in which:

Fig. 1 is a side view of a material handling truck embodying the novel features of our invention;

Fig. 2 is a plan view of the same;

Fig. 3 is a rear view of the same;

Fig. 4 is a longitudinal sectional view of the rear portion of the truck, taken on a medial plane;

Fig. 5 is a fragmentary side view of the rear end of the truck showing a modified means for actuating the lowering device;

Fig. 6 is a view similar to Fig. 5, illustrating a further alternative type of actuating means; and Fig. 7 is a rear view of the alternative structure shown in Fig. 6.

Referring to the drawings in detail, our improved truck unloading device is shown as applied to use on a truck 10 suitable for transporting lumber, piping or other relatively long articles or material. The present invention is concerned primarily with means for facilitating the unloading of lumber from delivery trucks and the drawings show the truck as utilized for transporting a stack 11 of boards, planks or other pieces of wood 12. While the truck 10 may be of a conventional type, we prefer to employ a truck having the operator's cab 13 located substantially above the front wheels 14 so as to provide maximum space for accommodating relatively long boards rearwardly of the cab. The stack 11 of lumber is supported by longitudinally spaced rollers 15 which extend transversely across the side members 16 of the chassis 17 of the truck, the rollers being rotatably mounted between guide elements 18. As the usual arrangement, the rearmost roller 15' of the series is disposed adjacent the rear end of the truck chassis 17 beyond the rear wheels 19 and each roller is provided with holes 21 at its ends. The side walls 22 of the truck body project above the top of the chassis 17 so as to partially cover the sides of the stack of lumber and preferably these walls are made in hinged sections, such as the one shown at 23, so that portions of the side walls can be opened to permit inspection and control of the various mechanisms enclosed thereby. The present vehicle has an engine 24 and other driving mechanism common to conventional motor trucks.

The boards or other lumber 12 is loaded on the truck by sliding the individual pieces forwardly along the supporting rollers 15 in a well-known manner and placing boards upon previously loaded boards to eventually build up the stack. The lumber may, however, be loaded onto the truck by mechanical means such as a lifting truck, hoist, etc. According to the usual practice, the stack is chained to the chassis to prevent displacement on the rollers and the lumber then may be transported to a destination. Upon arrival at the site where the lumber is to be unloaded, the chain is disconnected and the rollers 15 are rotated by means of a bar or rod inserted in any of the holes 21 of the rollers. As the rollers 15 are rotated the stack 11 is fed rearwardly and eventually the rearward projecting end of the stack overbalances the forward end thereof so that the stack tilts and slides rapidly down across the rearmost roller 15' with the lower, rearward edge of the stack violently striking the ground or other surface upon which the lumber is to be placed. In other cases, the truck platform may be tilted to cause the stack to slide rearwardly under the action of gravity. In any event, with the stack 11 in inclined position, that is, with its rearward end resting upon the ground and its forward end supported by the roller 15', the truck 10 is moved forwardly so as to withdraw the roller 15' and permit the forward end of the stack to fall upon the ground. This action results in violent impact of the lumber against the ground and often causes considerable damage to the lumber. In accordance with the present invention, means are provided for facilitating the unloading of the lumber from the truck, such means being constructed and arranged as next described.

Secured to a rear cross beam 30 of the chassis 17 are brackets 31 in which the ends of a shaft 32 are rotatably mounted. Angular supporting members or arms 33 are carried by the ends of the shaft 32 and connected between the free ends of the arms is a rod-like transverse member or auxiliary roller 34 which may be either rotatable or non-rotatable in the arms. The arms 33 normally assume the position indicated by dot-and-dash lines in Fig. 4 with the member or roller 34 in substantially horizontal alignment with the series of supporting rollers 15. When in this upper position, the member 34 may serve as a support for the rearward end of a stack 11 composed of relatively long boards. However, the supporting means 33, 34 is adapted to be swung downwardly as shown by full and dash lines in Fig. 4 under the weight of the stack 11 in the manner and for the purpose to be explained hereinafter.

One of the arms 33 may be pivotally connected by a pin 36 to the end of a rod 37. The rod 37 has an integral piston 38 fitted to slide in a dash-pot cylinder 39, the cylinder being pivotally mounted on a rod or stud 40 held by the chassis of the truck. Connected to the opposite ends of the dash-pot cylinder 39 are pipes 42 and 43 which lead to a valve 44, the valve being controlled by a manually operable handle 45 so as to permit transfer of air or liquid from either end of the cylinder to the other end thereof or to a reservoir, not shown. Thus, it is apparent that when the stack of lumber is resting upon the supporting member 34, and when the valve 44 is closed, the load of the stack will be sustained by the member. When it is desired to lower the stack, the valve 44 is operated to permit flow of fluid from the left hand to the right hand end of the cylinder 39 so as to allow the supporting means 33, 34 to pivot downwardly, the rate of descent of the supporting means being readily controlled by the valve. The valve handle 45 is preferably located inwardly from the side of the truck and to gain access thereto the panel 23 may be swung to the open position indicated by dot-and-dash lines in Fig. 1.

After the stack 11 has been completely unloaded from the truck 10, the supporting means 33, 34 is returned to normal elevated position by means of a spring 47 which is coiled around the piston rod 37 between the end of the cylinder 39 and the pivot pin 36. As will be apparent, the return spring 47 is rendered operative by actuating the valve 44 to permit flow of fluid from the right hand to the left hand ends of the dash-pot cylinder 39.

Assuming that a load or stack 11 of lumber is carried by the truck 10 and that the supporting and lowering means 33, 34 is in the upper position, indicated by dot-and-dash lines in Fig. 4, to unload the stack from the truck the rollers 15 are first rotated in a direction to feed the stack rearwardly with the rear end of the stack riding across the auxiliary roller 34. Eventually, the stack will have been moved to a position where it is unbalanced with respect to the rearmost stationary roller 15' but it is to be noted that the heavier rearward end of the stack will be adequately supported by the roller 34 and arms 33 which are locked in upper position by the dash-pot cylinder 39 and piston 38, this relation between the stack of lumber and the supporting means being illustrated by dot-and-dash lines in Fig. 4.

To lower the rear end of the stack of lumber, the valve 44 is operated to permit the piston 38 to move toward the left hand end of the cylinder 39. By this means the arms 33 are permitted to descend under the weight of the stack 11 and the rate of lowering of the arms is controlled by the valve 44 so as to gradually lower the rear end of the stack by causing the stack to pivot on the roller 15'. When the rear end of the stack rests upon the ground the roller 34 will be in the position shown by full lines in Fig. 4 and the stack will be supported in inclined position. To lower the forward end of the stack 11, the truck 10 is moved ahead until this end of the stack is sustained solely by the roller 34 and arms 33 and, since the valve 44 is open, the arms 33 will slowly descend to the position indicated by dash lines in Fig. 4 to lower the stack. As the truck is moved forward the roller 34 is withdrawn from beneath the stack 11 whereupon the stack will rest completely upon the ground or other supporting surface. By maintaining the valve 44 open to the proper extent during the forward movement of the truck 10, a uniform lowering of the stack may be effected and the roller 34 will be disengaged from the stack at substantially the same time that it completes its downward movement. After the truck has been unloaded in the manner explained above, the valve 44 may be actuated in the reverse direction to allow the arms 33 and roller 34 to return to first position under the influence of the spring 47.

Referring now to Fig. 5, the alternative stack lowering means consists of arms 50, similar to the arms 33, fastened to the ends of a transverse shaft 51 and having their free ends connected by a roller 52. The shaft 51 carries a worm-wheel 52' which is adapted to be rotated by a worm 53, the worm being driven by a hand crank 54. By rotating the worm 53 in either direction the arms 50 and roller 52 are raised and lowered as desired and, since the worm and worm-wheel remain in mesh at all times, separate returning means, such as the spring 47, are dispensed with and the device simplified somewhat.

In the alternative structure shown in Figs. 6 and 7 the stack lowering arms 60 carry a roller 61 and are fastened to the ends of a transverse shaft 62. The arms 60 are normally held in elevated position by means of a coil spring 63 which yields to permit the stack of lumber to descend onto the ground. The downward swinging movement of the arms 60 may be retarded by straps, ropes or like braking media 64 passing around a pulley 65 carried by the shaft 62.

It will be observed from the foregoing that our invention provides a simple, yet highly efficient means for facilitating the unloading of lumber and other material from trucks or like vehicles. As an important feature of the invention, the material unloading device is adapted to control the unloading in such a manner that the stack of material may be gradually lowered and deposited on the ground so as to positively guard against damage to the material and thus its use results in great savings. Where the unloading of lumber is uncontrolled, the stack gets out of hand and often causes considerable damage to buildings and other property, machinery, etc., as well as bodily injury. By the use of our stack lowering means the unloading operation is positively controlled and thus such damage and injury are avoided. It is to be particularly noted that the material handling device may be provided as standard equipment on lumber trucks or may be readily installed on existing trucks without materially altering their structure. It will also be understood that any combination of the controlling and operating means herein shown may be employed. For example, it is within the concept of our invention to provide pneumatic or hydraulic means for returning the load-supporting arms to elevated position in lieu of the spring means or gear connections illustrated in the drawings.

While we have herein shown and described the material unloading device as embodied in several preferred forms of construction, by way of example, it will be apparent that further modifications might be made in the structure thereof without departing from the spirit of the invention. Consequently, we wish to be afforded the full scope of the appended claims.

We claim as our invention:

1. A vehicle for transporting and depositing lumber and like material, including: a mobile truck having a stationary longitudinal platform adapted to support a stack of the material lengthwise of said truck, the stack of material being partially unloaded from said platform onto the surface upon which the truck rests by sliding the stack rearwardly of the platform to cause the rear end of the stack to descend and rest upon the surface; supporting roller means extending transversely of and mounted for substantially vertical movement in a path beyond the rear end of said truck and operative to sustain the forward end of the partially unloaded stack of material; and operating means for lowering said supporting means against the surface so as to lower the forward end of the stack into proximity to the surface.

2. A vehicle for transporting and depositing lumber and like material, including: a mobile truck having a stationary longitudinal platform adapted to support a stack of the material lengthwise of said truck, the stack of material being partially unloaded from said platform onto the surface upon which the truck rests by sliding the stack rearwardly of the platform to cause the rear end of the stack to descend and rest upon the surface; a pair of arms pivoted on a stationary axis extending transversely of said platform and projecting rearwardly from said platform; supporting roller means connected between the rearward ends of said arms, said arms being normally in elevated position to adapt said roller means to sustain the forward end of the partially unloaded stack of material; and operating means for lowering said arms and roller means so as to cause said roller means to rest upon the surface whereby to lower the forward end of the stack into proximity to the surface.

3. A vehicle for transporting and depositing lumber and like material, including: a mobile truck having a stationary longitudinal platform adapted to support a stack of the material lengthwise of said truck, the stack of material being partially unloaded from said platform onto the surface upon which the truck rests by sliding the stack rearwardly of the platform to cause the rear end of the stack to descend and rest upon the surface; a pair of arms pivoted on an axis extending transversely of said platform and projecting rearwardly from said platform; supporting roller means connected between the rearward ends of said arms, said arms being normally in elevated position to adapt said roller means to sustain the rearward end of the stack; and operating means for lowering said arms and roller means so as to first permit the rearward end of the stack to descend and rest upon the surface and so as to support the forward end of the stack when the truck is moved forwardly, said arms and roller means being adapted to be lowered to a position wherein said roller means rests upon the surface so as to lower the forward end of the stack into proximity to the surface.

4. A vehicle for transporting and depositing lumber and like material, including: a mobile truck having a stationary longitudinal platform adapted to support a stack of the material lengthwise of said truck, the stack of material being partially unloaded from said platform onto the surface upon which the truck rests by sliding the stack rearwardly of the platform to cause the rear end of the stack to descend and rest upon the surface; a pair of arms pivoted on an axis extending transversely of said platform and projecting rearwardly from said platform; supporting roller means connected between the rearward ends of said arms, said arms being normally in elevated position to align said roller means with the bottom of the stack so as to sustain the rearward end of the stack when the stack is slid rearwardly; and operating means for lowering said arms and roller means so as to first permit the rearward end of the stack to tilt downwardly and rest upon the surface and so as to support the forward end of the stack when the truck is moved forwardly, said arms and roller means being adapted to be lowered by said operating means to cause said roller means to rest upon the surface so as to lower the forward end of the stack to a point in proximity with the surface, further forward movement of said truck acting to withdraw said roller means from beneath the stack.

5. A vehicle as defined in claim 4 in which said operating means includes a dash-pot operatively connected to said arms for controlling the downward movement of said arms under the influence of the weight of the stack, and spring means for pivoting said arms upwardly.

6. A vehicle as defined in claim 4 in which said operating means includes a manually controlled dash-pot operatively connected to said arms for controlling the downward movement of said arms under the influence of the weight of the stack, and spring means for pivoting said arms upwardly.

7. A vehicle as defined in claim 4 in which said operating means consists of a manually rotatable worm meshing with a worm-wheel operatively connected to said arms.

8. A vehicle as defined in claim 4 in which said pivot axis consists of a transverse rotatable shaft to which said arms are connected, and in which said operating means consists of a manually rotatable worm meshing with a worm-wheel connected to said shaft.

9. A vehicle as defined in claim 4 in which said pivot axis consists of a transverse rotatable shaft to which said arms are connected, and in which said arms are adapted to be pivoted downwardly by the weight of the stack; brake means for controlling the downward pivotal movement of said arms; and spring means for pivoting said arms in an upward direction.

10. A vehicle for transporting lumber and the like material, comprising: a truck having a series of horizontal, longitudinally spaced, transverse stationary rollers adapted to support a stack of the material lengthwise of said truck; a transverse pivot shaft adjacent the rear end of said truck; a pair of arms carried by said shaft and projecting rearwardly from said truck; a movable roller extending between the rear ends of said arms and normally disposed at an upper position in alignment with said stationary rollers, the rearward end of the stack of material being adapted to rest upon said movable roller, said arms being adapted to be pivoted downwardly to an intermediate position to permit the rear end of the stack to descend into contact with the surface upon which said truck rests and to support the forward end of the stack when said truck is moved forwardly, said arms and movable roller being also movable to a lowermost position to cause said movable roller to rest upon the surface so as to permit the forward end of the stack to descend to a position in proximity to the surface and to permit the forward end of the stack to descend onto the surface when said truck is further moved forward to withdraw said movable roller from beneath the forward end of the stack; and operating means for pivoting said arms to upper, lower and intermediate positions.

11. A vehicle for transporting lumber and like material, comprising: a truck having stationary means for supporting a stack of material in horizontal position lengthwise of said truck; unloading means disposed on the rear end of said truck and movable relative to said supporting means in substantially vertical direction, said unloading means being normally in an upper position to adapt it to sustain the rearward end of the stack when the stack is moved rearwardly with respect to said supporting means and also adapted to move downwardly to lower the rear end of the stack onto the surface upon which said truck rests, said unloading means being further adapted to be drawn forwardly beneath said stack by said truck to sustain the forward end of the stack when said truck is moved forwardly and to be subsequently lowered by the weight of the stack to permit the forward end of the stack to descend onto the surface; control means for controlling the rate of lowering of said unloading means; and automatic means for returning said unloading means to upper position following the unloading operation.

12. In a vehicle for transporting lumber and like material and having means for supporting a stack of the material in substantially horizontal position lengthwise of the vehicle; an unloading device mounted on the rear end of the vehicle and including a bifurcated member pivotally attached to the vehicle and provided with a transverse portion normally disposed in an upper position to adapt it to sustain the rear end of the stack when the stack is moved rearwardly with respect to the supporting means, said bifurcated member being adapted to pivot downwardly under the weight of the stack to lower the rear end of the stack onto the surface upon which the vehicle rests and also adapted to be carried forwardly beneath the stack by the vehicle upon forward movement of the vehicle so as to sustain the forward end of the stack, said bifurcated member being adapted to pivot downwardly to a further extent either during or following the forward movement of the vehicle so as to lower the forward end of the stack onto the surface; control means for controlling the rate of downward pivotal movement of said bifurcated member; and operating means for returning said bifurcated member to upper position following the unloading operation.

PAUL PENBERTHY.
WELLINGTON EVERETT MILLER.

REFERENCES CITED

The following references are of record in the file of this patent:

UNITED STATES PATENTS

| Number | Name | Date |
|---|---|---|
| 141,098 | Abeel | July 22, 1873 |
| 365,569 | Blake | June 28, 1887 |
| 999,310 | Karches | Aug. 1, 1911 |
| 1,231,182 | Maxwell | June 26, 1917 |
| 1,443,749 | Knerr | Jan. 30, 1923 |
| 1,945,426 | Evoy | Jan. 30, 1934 |
| 1,990,335 | Laffey et al. | Feb. 5, 1935 |
| 2,156,438 | Suverkrup | May 2, 1939 |
| 2,391,412 | Gorton | Dec. 25, 1945 |
| 2,418,726 | Rogers, Jr. | Apr. 8, 1947 |
| 2,452,681 | Rehberger | Nov. 2, 1948 |
| 2,470,360 | Messick | May 17, 1949 |

FOREIGN PATENTS

| Number | Country | Date |
|---|---|---|
| 483,326 | Great Britain | Apr. 19, 1938 |
| 413,030 | France | May 18, 1910 |
| 19,524 of 1929 | Australia | Mar. 19, 1930 |